United States Patent [19]
Saito

[11] Patent Number: 5,803,651
[45] Date of Patent: Sep. 8, 1998

[54] DOUBLE LOCKING CONNECTOR

[75] Inventor: Hitoshi Saito, Shizuoka, Japan

[73] Assignee: Yazaki Corporation, Tokyo, Japan

[21] Appl. No.: 795,994

[22] Filed: Feb. 5, 1997

[30]   Foreign Application Priority Data

Feb. 7, 1996 [JP] Japan .................................. 8-021142

[51] Int. Cl.⁶ .................................................. B25G 3/18
[52] U.S. Cl. .............................. 403/329; 403/11; 403/27; 403/316; 439/352
[58] Field of Search ..................................... 439/488, 489, 439/352, 353; 403/329, 326, 315, 316, 318, 319, 11, 27; 285/18, 93

[56]            References Cited

U.S. PATENT DOCUMENTS

| | | | |
|---|---|---|---|
| 4,946,395 | 8/1990 | Cope et al. | 439/489 X |
| 5,120,255 | 6/1992 | Kouda et al. | 439/489 |
| 5,174,786 | 12/1992 | Kato et al. | 439/489 |
| 5,605,472 | 2/1997 | Sakai et al. | 439/489 |
| 5,643,003 | 7/1997 | Myer et al. | 439/489 X |

FOREIGN PATENT DOCUMENTS 6-159857  7/1994  Japan .

*Primary Examiner*—Kenneth J. Dorner
*Assistant Examiner*—William L. Miller
*Attorney, Agent, or Firm*—Armstrong, Westerman, Hattori, McLeland & Naughton

[57]            ABSTRACT

A double locking connector with an engagement detecting member disposed slidably on an operating section of a flexible locking arm of a connector housing, in a direction of connector engagement, to slidably lock a locking lug of a flexible detection arm of the engagement detecting member on a locking section of the flexible locking arm, wherein an abutting projection against the flexible detection arm locked within a space of flection of the flexible locking arm is disposed in the connector housing to prevent the deflection of the flexible locking arm from being caused. An operating plate section of the engagement detecting member over laps a front end section of a mating connector housing in a state of the flexible detection arm being locked.

11 Claims, 4 Drawing Sheets

DOUBLE LOCKING CONNECTOR

BACKGROUND OF THE INVENTION

1. Field of the Invention

The present invention relates to a double locking connector that prevents inadvertent disengagement between the male and female connector housings by blocking the flexure of a flexible locking arm on some of these housings when engaged with an engagement detecting member.

2. Description of the Prior Art

Referring to FIGS. 6 through 9, there are shown an engagement detectable connector proposed in Japanese Patent Application Laid Open No. 6-159857 filed by the same applicant.

As shown in FIG. 6, an engagement detectable connector 31 is composed of a male connector housing 33 made of synthetic resin having a flexible locking arm 32, an engagement detecting member 35 made of synthetic resin adapted to be slidably loaded on an operating section 34 of the locking arm 32, a female connector housing 38 made of synthetic resin having an engaging projection 37 for a locking projection 36 of the locking arm 32, and terminals, not shown, accommodated in the housings 33 and 38.

The engagement detecting member 35 has a flexure detecting arm 40 formed lengthwise, underneath an operating plate section 39, in an engaging direction of the connector. The flexure detecting arm 40 has a locking lug 41 for engaging the locking projection 36.

FIG. 7 shows a state of halfway or incomplete engagement of the locking projection 36 of the locking arm 32 with the locking projection 37 of the female connector housing 38, or incomplete engagement of these locking projections. In this state, the locking lug 41 of the detecting arm 40 abuts the rear end of the locking projection 36, thereby preventing the engagement detecting member 35 from sliding frontward. Thus, the incomplete engagement of the connectors can be detected.

On the other hand, FIG. 8 shows a state of complete engagement of the connectors, wherein the locking projection 36 of the locking arm 32, having returned to its relaxed condition after having been pressed down by the locking projection 37 of the female connector housing 38, such that the locking lug 41 on the detecting arm 40 can slide along an undersurface of the locking projection 37 and under a lower surface 36a of the locking projection 36 of the lock arm 32, thereby allowing the detecting member 35 to move slidably frontward. Consequently, as shown in FIG. 9, the locking lug 41 smoothly rides across the locking projection 36 and engages with the front end of the locking projection 36 to fix the engagement detecting member 35 for the detection of complete connector engagement.

Further, in the above state of engagement, a front end 39a of the operating plate section 39 of the engagement detecting member 35 engages with the upper surface at the front end of the female connector housing 38 adjacent the upper side of the locking projection 37 to prevent the locking arm 32 from being flexed by an accidental external force, thus to prevent the engagement from unlocking by providing a function of double locking.

In the above said connector 31, however, if the operating plate section 39 of the engagement detecting member 35 is jerked down from the state of complete engagement of the connectors of FIG. 9 into a direction of unlocking the engagement, the operating plate section 39 is flexed and then the locking arm 32 is pressed down, thereby causing unlocking. The jerking also has damaged the engagement detecting member 35.

SUMMARY OF THE INVENTION

It is therefore an object of the present invention to provide a double locking connector wherein the jerking down of an operating plate of a engagement detecting member neither unlocks a locking arm nor damages the engagement detecting member.

In attaining the objective of the present invention, according to one aspect, there is provided a double locking connector having an engagement detecting member disposed slidably, in a direction of engagement, on an operating section of a flexible locking arm of a connector housing for slidably locking a locking lug of a flexure detection arm of the engagement detecting member on a locking section of the flexible locking arm, wherein a projection abutting against the flexure detecting arm, being locked within a flexible space of the flexible locking arm, is disposed in the connector housing to prevent the flexible locking arm from being flexed.

According to another aspect of the present invention, there is provided a double locking connector, wherein an operating plate section of the engagement detecting member is placed on a front end portion of the mating connector housing in a state in which the flexible detection arm is locked.

When both connector housings are completely fit with each other, the locking section of the locking arm is engaged at the front end of the locking projection of the mating connector housing. The locking lug of the engagement detection arm is pressed down by the locking projection and slid along the locking section, by the sliding operation of the engagement detecting member, to be engaged with the front end of the locking section, thereby providing complete engagement between both the connector housings. Even if it is attempted to push down the operating plate of the engagement detecting member, the abutting projection abuts the detection arm and this prevents the locking arm from being flexed. At the same time, the operating plate abuts the mating connector housing for preventing the locking arm from being flexed.

The above and other objects, features and advantages of the present invention will be more apparent from the accompanying drawings.

DETAILED DESCRIPTION OF PREFERRED EMBODIMENTS

This invention will now be described in further detail by way of example by referring to the accompanying drawings.

FIGS. 1 through 5 illustrate a double locking connector according to one preferred embodiment of the present invention.

The double locking connector 1 is incorporated with an abutting projection (disengagement preventing projection) 5 against a flexure detection arm 4 of an engagement detecting member 3 made of synthetic resin on a male connector housing 2 made of synthetic resin similarly to the conventional connector.

Figure 3:
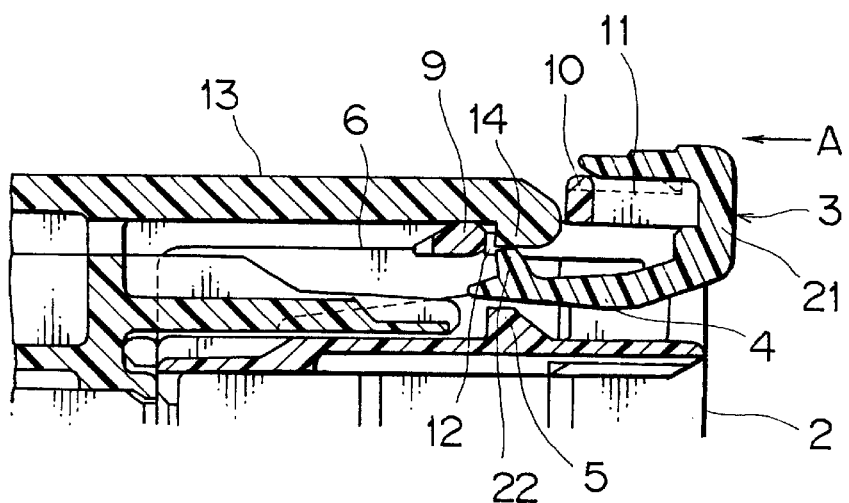
FIG. 3 is a longitudinal cross sectional view in part illustrating an engagement detecting member in a state of temporarily locked in the completed engaged connector housings.
Figure 5:
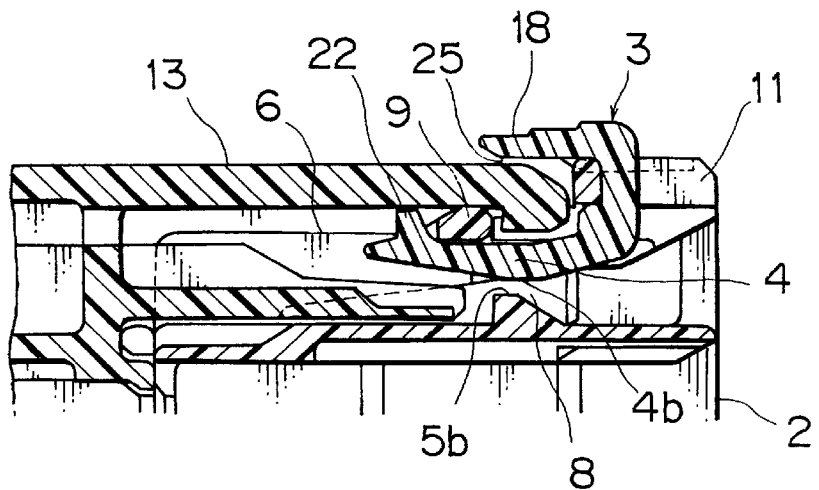
FIG. 5 is a longitudinal cross sectional view in part illustrating a state of complete locking of the engagement detecting member.
Figure 6:
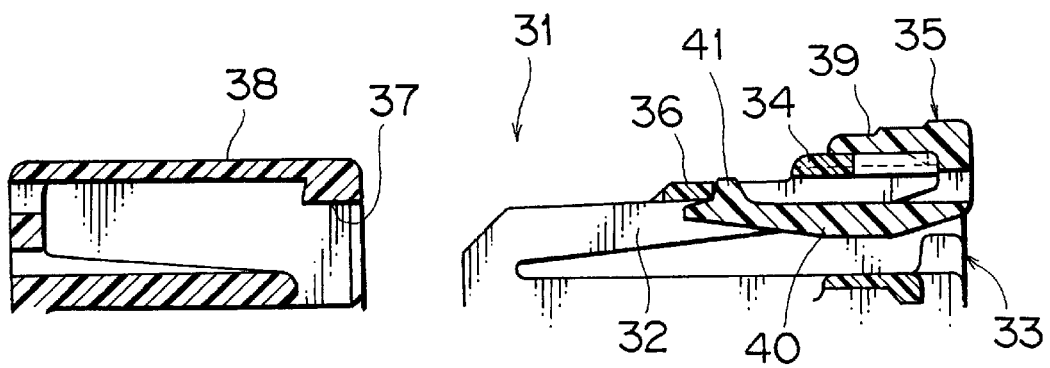
FIG. 6 is a longitudinal cross sectional view in part illustrating a prior-art double locking connector.
Figure 7:
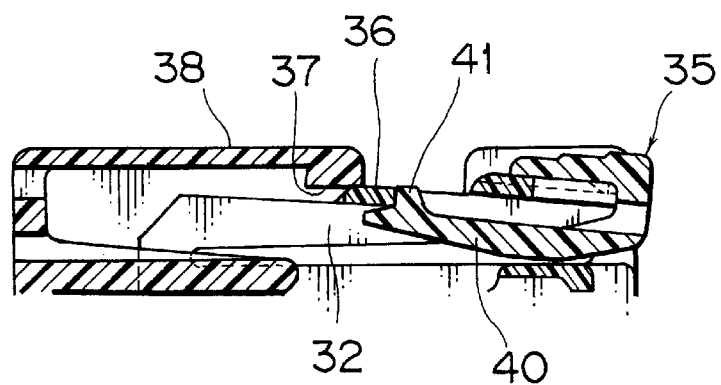
FIG. 7 is a longitudinal cross sectional view in part illustrating a state of incomplete engagement of the prior-art double locking connector of FIG. 6.
Figure 8:
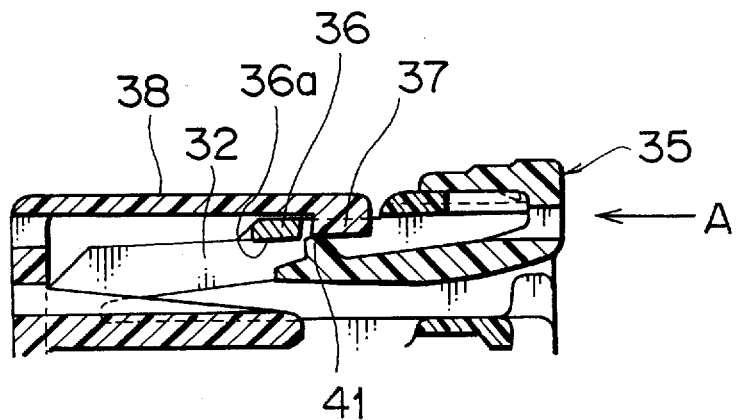
FIG. 8 is a longitudinal cross sectional view in part illustrating a transit state of an engagement detecting member of the prior-art double locking connector to be slid after completing the connector engagement.
Figure 9:
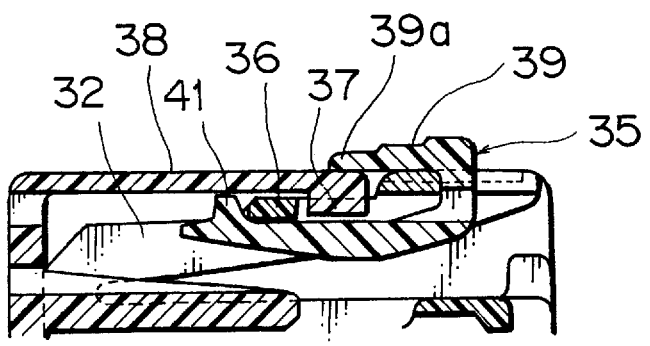
FIG. 9 is a longitudinal cross sectional view in part illustrating a state of the engagement detecting member being slid.

When the engagement detecting member 3 is completely locked against a flexible locking arm 6 of the male connector housing 2 as shown in FIG. 5, the abutting projection 5 is at a position in close proximity below the flexible locking arm 6 within a space 8 of flexure of the locking arm 6 and abuts the flexible detection arm 4 at the time of unlocking operation of the locking arm 6 while, at the time when the detection member 3 is temporarily locked as shown in FIG. 3, it does not interfere with the detection arm 4 even by the pressing down of the locking arm 6. Therefore, the flexure of the locking arm 6 is effectively prevented from occurring when the engagement detecting arm 4 is at its position of complete locking, thus providing reliable double locking without failure.

Figure 1:
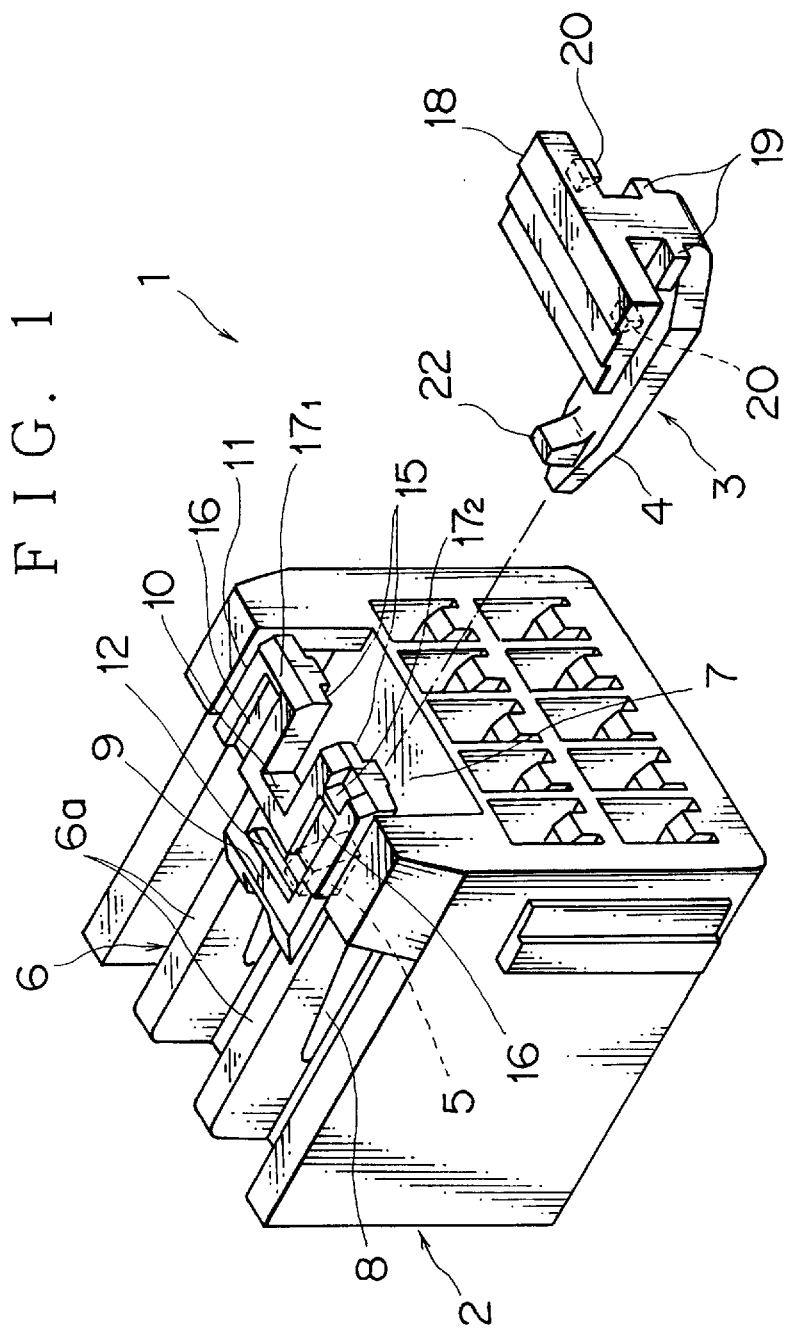
FIG. 1 is an exploded perspective view illustrating a double locking connector embodying the present invention.

As shown in FIG. 1, the abutting projection 5 is protrusively arranged on a upper wall 7 of the male connector housing. The upper wall 7 is protrusively formed with a locking arm 6 defined by a pair of mutually spaced arm pieces 6a, 6a. The abutting projection 5 is positioned underneath the middle portion of the locking arm 6 between the arm pieces which provides the space 8 of flexure of the locking arm 6. The locking arm 6 has a locking projection 9 for interconnecting the pair of arm pieces 6a, 6a, a stopper projection 10 for interconnecting the pair of arm pieces 6a, 6a rearwardly of the locking projection 9, and an operating section 11 made higher than the locking projection by one step and including the stopper projection 10. The abutting projection 5 is positioned beneath an opening 12 formed between the locking projection 9 and the stopper projection 10. As shown in FIG. 3, a locking projection 14 at the front end of a mating female connector housing 13 projects into the opening 12 for locking.

Figure 4:
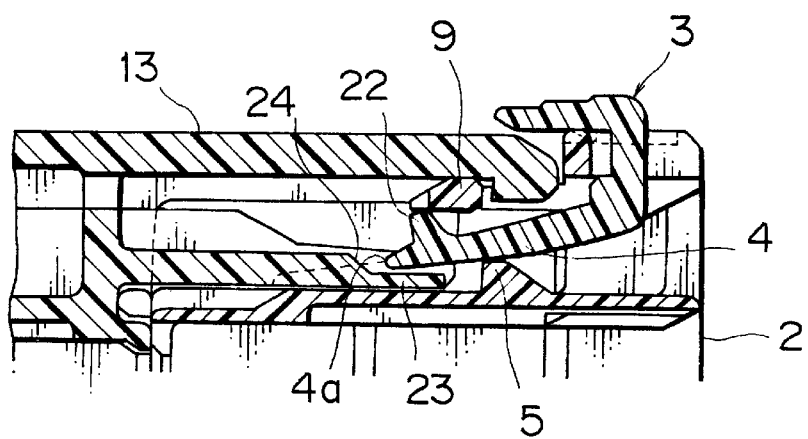
FIG. 4 is a longitudinal cross sectional view in part illustrating a transitory state of the engagement detecting member to be brought into the complete engagement.

The operating section 11 is formed with temporary locking projections $17_1$, $17_2$ positioned in upper guide groove 16 and lower guide groove 16 against the detection member 3. The engagement detecting member 3 has a pair of locking projections 19, 19 to be engaged with the guide grooves 15 on the base of the flexible detection arm 4 extending from an operating plate section 18, and a pair of engaging lugs 20, 20 for the locking projections $17_1$, $17_2$ at the rear side of the operating plate section 18. When the engaging lugs 20, 20 ride over the locking projections $17_1$, $17_2$, the engagement detecting member 3 is temporarily locked on the operating section 11 of the locking arm 6. When the engagement detecting member 3 is pushed further in a connector engaging direction (the direction shown by an arrow A of FIG. 3), a locking lug 22 at the front end of the detection arm 4 rides across the locking projection 9 by sliding at the lower side thereof as shown in FIG. 4 and is brought into engagement with the front end of the locking projection 9, as shown in FIG. 5, and, at the same time, an arm base 21 abuts upon the stopper section 10.

Figure 2:
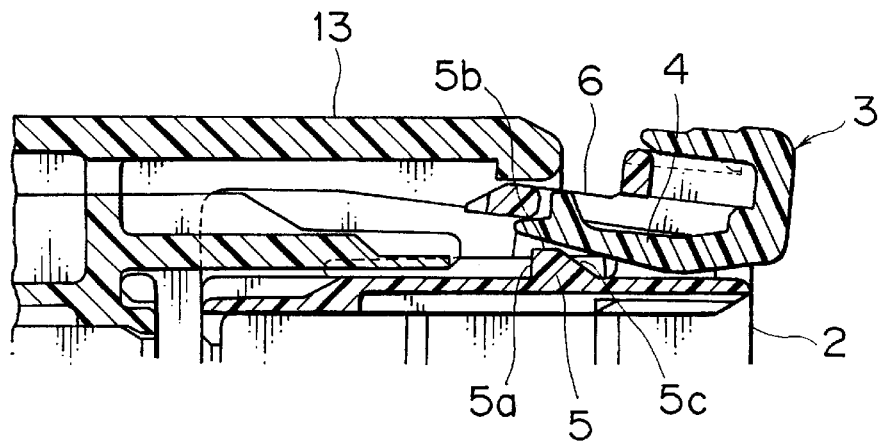
FIG. 2 is a longitudinal cross sectional view in part illustrating both connector housings being partially engaged with each other.

The abutting projection 5 has a vertical surface 5a (FIG. 2), a horizontal surface 5b at the apex, and a tapered or tilted surface 5c at the rear side. The tilted surface 5c serves as a guide surface for the detection arm 4 when the male connector housing 2 is brought into engagement with the female connector housing 13 as shown in FIG. 2. Simultaneously, the tilted surface serves as an escape surface for the detection arm 4 when the locking arm is flexed in a direction of unlocking. The female connector housing 13 is provided with a guide projection 23 opposed to the front side of the detection arm 4 in a long protrusive manner, as shown in FIG. 4. When the detection member 3 is brought into complete engagement, the front end 4a of the detection arm 4 is guided upward along the tapered surface 24 of the guide projection 23.

Referring to FIG. 5, the apex 5b of the abutting projection 5 is opposed to the bottom portion 4b of the detection arm 4 of the fully locked engagement detection member 3, wherein the bottom portion 4b is projecting downward with a shape of letter "V." By supporting the engagement detection member 3 without causing any lifting in a way that the upper surface of the detection arm 4 is abutted upon the locking projection 9 and the engaging projections 19 are engaged with the guide grooves 15, the engagement detecting member is unitized with the locking arm, thereby preventing the detection arm from being flexed. Further, when the detection member 3 is brought to a state of complete locking, the operating plate section 18 of the engagement detecting member 3 rides over the top wall of the front end 25 of the male connector housing 13, thereby cooperating with the abutting projection 5 for preventing the locking arm 6 from being flexed. With these actions, the connector is completely prevented from being disengaged inadvertently.

In addition, when the engagement detection member 3 is pressed down from the state of FIG. 5 to a state of temporary locking of FIG. 3, the front end of the detection arm 4 is brought over the abutting projection 5 and the detection arm 4 moves integrally with the locking arm 6, as shown in FIGS. 2 and 3, there is no interference for any deflection of the locking arm 6. It will be apparent that the shape of the abutting projection 5 is not limited to a triangle shape but it may be formed into a semicircular or semispheric shape.

As described and according to the invention, the abutting projection of the connector housing abuts the detection arm when the engagement detecting member is locked to prevent the flexible locking arm from being flexed, so that the pressing down of the engagement detecting member will not unlock the locking arm and, at the same time, will not deform the engagement detecting member to damage the detection member. In addition, the operating plate section will be placed over the mating connector housing upon locking of the engagement detecting member, the locking arm can not be flexed, thus providing the reliable double locking along with the act of the abutting projection.

While the preferred embodiment of the present invention has been described using specific terms, such description is for illustrative purposes only, and it is to be understood that changes and variations may be made without departing from the spirit or scope of the appended claims.

What is claimed is:

1. A double locking connector comprising:

a pair of mating connector housings in which one of said housings contains a flexible locking arm depressible into a flexure space between said connector housings and having a locking projection cooperable with a locking projection on the other of said housings for maintaining locked interconnection of said connector housings; an engagement detection member slidably disposed on said flexible locking arm, said engagement detection member having a locking lug engagaeble with said locking projection of said locking arm when said connector housings are completely interconnected; said one connector housing having an abutting projection disposed within said flexure space of said flexible locking arm; said abutting projection extending from said one connector housing to a position in close proximity below the engagement detection member and being operative to engage said engagement detection member to prevent flexure of said flexible locking arm, and wherein said flexible locking arm is defined by a pair of mutually spaced arm pieces and said abutting projection is positioned within said flexure space between said arm pieces of said flexible locking arm.

2. A double locking connector comprising:

a pair of mating connector housings in which one of said housings contains a flexible locking arm depressible into a flexure space between said connector housings and having a locking projection cooperable with a locking projection on the other of said housings for maintaining locked interconnection of said connector housings; an engagement detection member slidably disposed on said flexible locking arm, said engagement detection member having a lacking lug engageable with said locking projection of said locking arm when said connector housings are completely interconnected; said one connector housing having an abutting projection disposed within said flexure space of said flexible locking arm; said abutting projection extending from said one connector housing to a position in close proximity below the engagement detection member and being operative to engage said engagement detection member to prevent flexure of said flexible locking arm, and wherein said flexible locking arm has a pair of arm pieces provided with a locking projection interconnecting said pair of arm pieces, a stopper projection spaced from said locking projection and interconnecting said pair of arm pieces at a rear portion of the locking projection, and an operating section.

3. The double locking connector as claimed in claim 2, wherein said abutting projection is positioned beneath an opening formed between the locking projection and the stopper projection.

4. The double locking connector as claimed in claim 2, wherein said engagement detection member includes an operating plate section and a flexible engagement detection arm having said locking lug and a base, and a pair of locking projections extending from the base of the flexible engagement detection arm, guide grooves formed in said operating section of said flexible locking arm operative to receive said locking projections, and a pair of engaging lugs on said engagement detection member at a rear side of said operating plate section, to be temporarily locked with said locking projections provided on said operating section of said flexible locking arm.

5. The double locking connector according to claim 4 wherein said operating plate section of said engagement detection member overlaps a front end section of said other connector housing when said housings are connected.

6. A double locking connector comprising: a pair of mating connector housings having walls which, when said connector housings are mutually connected, cooperate to define a flexure space therebetween, one of said connector housings containing a flexible locking arm depressible into said flexure space between said connector housings and having a locking projection cooperable with a locking projection on the other of said housings for maintaining locked interconnection of said connector housings; an engagement detection member carried by said flexible locking arm, said engagement detection member having a flexure detection arm slidably movable in said flexure space and having a locking lug engageable with said locking projection of said locking arm when said connector housings are completely interconnected, and a wall of said one connector housing having an abutting projection disposed within said flexure space such that said abutting projection is out of contact with said engagement detection member when said housings are mutually interconnected, said abutting projection being operative to engage said flexure detection arm of said engagement detection member to prevent flexure of said flexible locking arm when said connector housings are interconnected.

7. The double locking connector as claimed in claim 6, wherein said abutting projection extends from said one connector housing to a position in close proximity below the engagement detection member.

8. The double locking connector as claimed in claim 7, wherein said abutting projection is provided on an upper wall of said one connector housing.

9. The double locking connector as claimed in claim 6, wherein said abutting projection is provided on an upper wall of said one connector housing.

10. A double locking connector comprising: a pair of mating connector housings in which one of said connector housings contains a flexible locking arm depressible into a flexure space between said connector housings and having a locking projection cooperable with a locking projection on the other of said housings for maintaining locked interconnection of said connector housings; an engagement detection member slidably disposed on said flexible locking arm, said engagement detection member having a locking lug engageable with said locking projection of said locking arm when said connector housing are completely interconnected; said connector housing having an abutting projection disposed within said flexure space of said flexible locking arm operative to engage said engagement detection member to prevent flexure of said flexible locking arm, wherein said flexible locking arm has a pair of arm pieces provided with a locking projection interconnecting said pair of arm pieces, a stopper projection spaced from said locking projection and interconnecting said pair of arm pieces at a rear portion of the locking projection and an operating section.

11. The double locking connector according to any one of claims to 1 to 3 and 6 to 10, wherein an operating plate section of said engagement detecting member overlaps a front end section of said other connector housing when said housings are connected.

\* \* \* \* \*